(12) United States Patent
Peterson

(10) Patent No.: US 7,832,746 B2
(45) Date of Patent: Nov. 16, 2010

(54) SCOOTER FOR SEATED MANUAL PROPULSION

(76) Inventor: C. Dean Peterson, 6250 Country Ridge La., Johnston, IA (US) 50131

( * ) Notice: Subject to any disclaimer, the term of this patent is extended or adjusted under 35 U.S.C. 154(b) by 0 days.

(21) Appl. No.: 12/337,102

(22) Filed: Dec. 17, 2008

(65) Prior Publication Data

US 2009/0194960 A1    Aug. 6, 2009

Related U.S. Application Data

(60) Provisional application No. 61/026,288, filed on Feb. 5, 2008.

(51) Int. Cl.
*B62M 1/00*    (2010.01)
(52) U.S. Cl. ................... 280/87.05; 280/30; 280/87.01
(58) Field of Classification Search ............. 280/87.01, 280/87.021, 87.05, 87.051, 47.11, 828, 287, 280/278; 180/907; 135/67, 74
See application file for complete search history.

(56) References Cited

U.S. PATENT DOCUMENTS

| | | | |
|---|---|---|---|
| 1,535,167 A |   | 4/1925 | Lovell |
| 1,658,068 A | * | 2/1928 | White .................. 280/87.041 |
| 2,439,556 A |   | 4/1948 | Bancroft |
| 3,075,789 A | * | 1/1963 | Hott ............................ 280/295 |
| 3,354,975 A |   | 11/1967 | Stuart |
| 4,732,403 A | * | 3/1988 | Grattapaglia ................ 280/278 |
| 5,169,165 A | * | 12/1992 | Oates ...................... 280/87.03 |
| 5,848,660 A |   | 12/1998 | McGreen |
| 6,161,860 A | * | 12/2000 | Corneau ...................... 280/642 |
| 6,176,337 B1 |   | 1/2001 | McConnell et al. |
| 6,315,307 B1 |   | 11/2001 | Chen et al. |
| 6,443,470 B1 |   | 9/2002 | Ulrich et al. |
| 6,481,729 B2 |   | 11/2002 | Herman et al. |
| 6,851,498 B1 |   | 2/2005 | Sauve |
| D513,629 S |   | 1/2006 | Sramek |
| 7,156,405 B1 |   | 1/2007 | Ming |
| 7,159,681 B1 | * | 1/2007 | Sauve .......................... 180/208 |
| 7,568,720 B2 | * | 8/2009 | Golias ......................... 280/639 |
| 2007/0182116 A1 | * | 8/2007 | Davey et al. ............. 280/87.05 |

OTHER PUBLICATIONS

Knee Walker, Round About Mobility Mate's Turning Leg Caddy. catalog pages from www.medicalproductsdirect.com/knwaroabmoma.html. (3 pages).

* cited by examiner

*Primary Examiner*—Lesley Morris
*Assistant Examiner*—Katy Meyer
(74) *Attorney, Agent, or Firm*—McKee, Voorhees & Sease, P.L.C.

(57) ABSTRACT

A non-motorized scooter is provided with a base and front and rear wheels mounted on the base. A seat is mounted on the base for folding between an upright riding position and a folded storage position. Handlebars are pivotally mounted on the base for movement between an upright riding position and a folded storage position. The seat and handlebars fold toward one another in a side-by-side position for storage. Outrigger wheels on the rear of the scooter maintain the scooter in an upright position without touching by a person. The height of the seat and handlebars can be adjusted for both the riding position and the storage position, such that the scooter can be used as a crutch or cane when the seat and handlebars are folded downwardly. Optional accessories may be provided for the scooter, including a light, a water bottle holder, and a storage basket.

22 Claims, 7 Drawing Sheets

SCOOTER FOR SEATED MANUAL PROPULSION

CROSS-REFERENCE TO RELATED APPLICATIONS

This application claims priority under 35 U.S.C. §119 to provisional application Ser. No. 61/026,288 filed Feb. 5, 2008 herein incorporated by reference in its entirety.

FIELD OF THE INVENTION

The invention is directed towards a scooter having a seat which allows a person to sit down while manually propelling the scooter for transportation over extended distances. The seat and handlebars of the scooter can be folded to a storage position. In the folded position, the scooter also can be used as a crutch or cane.

BACKGROUND OF THE INVENTION

Some people have problems walking due to various medical conditions. For example, arthritis causes pain in the ankle, knee and/or hip joints which may limit walking. Although these people may be ambulatory, walking is painful, particularly for anything beyond short distances. However, many people seek to avoid use of a wheelchair, for numerous reasons. While there are commercially available motorized scooters which a person can ride, such scooters typically are heavy, expensive and require periodic recharging of batteries. Motorized scooters are also difficult to load into and out of cars, and cannot be taken up and down steps.

Manually operated scooters are also well-known, but typically do not include a seat, thereby requiring a person to stand on the base of the scooter with one or both feet. Scooters with seats are also known. Some seats are fixed and do not fold, such that the scooter is somewhat bulky for storage. Some seats include complex folding structures which add to the weight and expense of the scooter, and thus are less than optimal.

Accordingly, a primary objective of the present invention is the provision of an improved, manually propelled scooter having a seat and handlebars which are foldable between use and storage positions.

Another objective of the present invention is the provision of a lightweight, portable scooter which allows a person to quickly and easily move long distances without undue stress on their legs and joints.

A further objective of the present invention is the provision of a non-motorized scooter which is propelled by one or both legs of a rider.

A further objective of the present invention is the provision of a combination scooter, cane and crutch.

Another objective of the present invention is the provision of an improved scooter having a pair of outrigger wheels to maintain the scooter in an upright position when not touched by a person.

Still another objective of the present invention is the provision of a scooter having a seat post and a handlebar post which fold toward one another so as to reside laterally side by side in a storage position.

Yet another objective of the present invention is the provision of a scooter having a seat and handlebars with offset pivot axes for simplified folding between a use position and a storage position.

Another objective of the present invention is the provision of an improved scooter for sit down riding and including a hand actuated brake.

A further objective of the present invention is the provision of an improved scooter having a seat with a basket removably mounted on the seat post.

Still another objective of the present invention is the provision of an improved scooter having a folding seat with a quick release lock to normally retain the seat in an upright riding position.

Still another objective of the present invention is the provision of a scooter which allows a person to sit, while "walking".

Another objective of the present invention is the provision of a manually propelled scooter with a seat which is economical to manufacture, and durable and safe in use.

These and other objectives will become apparent from the following description of the invention.

SUMMARY OF THE INVENTION

The non-motorized scooter of the present invention includes a base having a longitudinal axis. A single seat post is pivotally mounted on the base for movement approximately 90° between a substantially vertical riding position and a lowered storage position. A seat is mounted on top of the post. The seat post has telescoping sections so that the seat height is adjustable. A handlebar post with upper handlebars is pivotally mounted on the base for movement between an upright use position and a folded storage position. The seat and handlebars have horizontal, non-parallel pivot axes so as to fold down to a side by side relationship in the storage position. A quick release lock is provided on the seat and on the handlebar posts for quick and easy folding action of the seat and handlebars. Front and rear primary wheels are mounted on the base along the longitudinal axis for supporting a person's weight while sitting on the seat. A pair of outrigger wheels are pivotally attached to the base, and are spaced outwardly from the longitudinal axis so as to maintain the scooter upright when a person is not sitting on the seat. A hand actuated brake is provided for braking action on the rear primary wheel. The seat and handlebar posts include telescoping post sections for height adjustment. When the seat and handlebars are folded down, the scooter can be used as a crutch or a cane, with the seat engaging the ground and the handlebars gripped by the user's hand or positioned under their armpit.

The scooter of the present invention is intended to be ridden with manual propulsion both indoors and out of doors. The scooter is narrower than a person's body so as to easily move through doorways, and is lightweight so that it can be carried, for example, up and down stairs. When the rider dismounts the scooter, the outrigger wheels maintain the scooter in an upright position without any additional support. The hand actuated brake allows the rider to control the speed of the scooter when coasting. The height of the handlebars and seat are adjustable so as to accommodate persons of different sizes. A removable basket can be quickly and easily mounted on the seat post for carrying various objects and articles, such as a purse, backpack, notebook, food and drink, or any other relatively small, lightweight object.

The handlebars and seat can be folded downwardly for transportation and/or shipping. Also, in the folded position, the seat and handlebars can be retracted to a height for use as a cane or extended for use as a crutch.

The seat post is centered upon the base of the scooter when in the raised, riding position. However, the pivot axis for the seat is offset or angled slightly so that the seat folds down and slightly to the side, so that the handlebars can also fold down without interference.

Preferably, the seat, brake, and outrigger wheels are simply added to the commercially available Razor® scooter which has a fold-down, telescoping handle. In a preferred embodiment, a U-shaped bracket is welded or otherwise connected to the base of the Razor® scooter. A seat pivot axle and the outrigger wheel axle extend through opposite sides of the bracket. A connecting cable extends from the hand brake lever to a pivotal brake lever at the rear of the scooter, such that the lever pivots downwardly into engagement with the rear wheel fender when the hand lever is depressed by the rider, such that the fender engages the rear wheel so as to slow the scooter.

A pair of outrigger wheels extend rearwardly from the rear axle mounted to the bracket behind the seat post. A small gas cylinder extends between the base and the frame of the outrigger wheels. When no one is sitting on the seat, the gas cylinder extends slightly so as to push the outrigger wheels downwardly so as to balance the scooter and maintain the scooter in an upright position. When a rider sits down on the seat, the rider's weight overcomes the bias of the cylinder, such that the rider's weight is supported by the main front and rear wheels of the scooter. Guards or deflectors may extend from the frame outwardly around the outer lateral sides of the outrigger wheels. The deflectors prevent the wheels from catching on doorways or other objects if the rider gets too close.

A pivotal latch is provided to lock in an upright position. The latch lever can be manually pulled so as to disengage the latch, thereby allowing the seat to fold forwardly.

When folded, the scooter can be easily carried up and down stairs, or used as a cane or crutch by a person walking or going up and down stairs. The scooter easily fits behind the front seat of an automobile, in both unfolded and folded positions. Also, the folded scooter is sufficient compact so as to fit into the overhead bin of an airplane, which can then be unfolded for the user to ride through the airport terminal using their own power. The scooter can also be folded down for shipping, storage, or packaging.

A basket can be removably mounted to the scooter. In a preferred embodiment, a bracket is mounted on the seat post and the basket can be hung on the bracket. The basket has a narrow width so as to prevent interference with a rider's legs as they ride the scooter.

Thus, the scooter of the present invention allows a user to "walk" while riding the scooter, simply by using a substantially normal gait, with their feet alternatingly touching the floor or ground. Alternatively, the scooter can be propelled using one leg and foot of the rider, with the other foot resting on the base. The narrow profile of the scooter allows a person to ride anywhere they could walk. Also, since the user only sits down a very short distance onto the seat, they remain at substantially their full height so as to easily carry on conversations, even while at a counter or desk, such as ticket counters, reception rooms, and various business establishments. The user can also rest while seated on the scooter, without moving.

Thus, the scooter of the present invention can be used by any person who has full or partial use of their legs for quick and easy movement without assistance.

DETAILED DESCRIPTION OF THE PREFERRED EMBODIMENT

Figure 1:
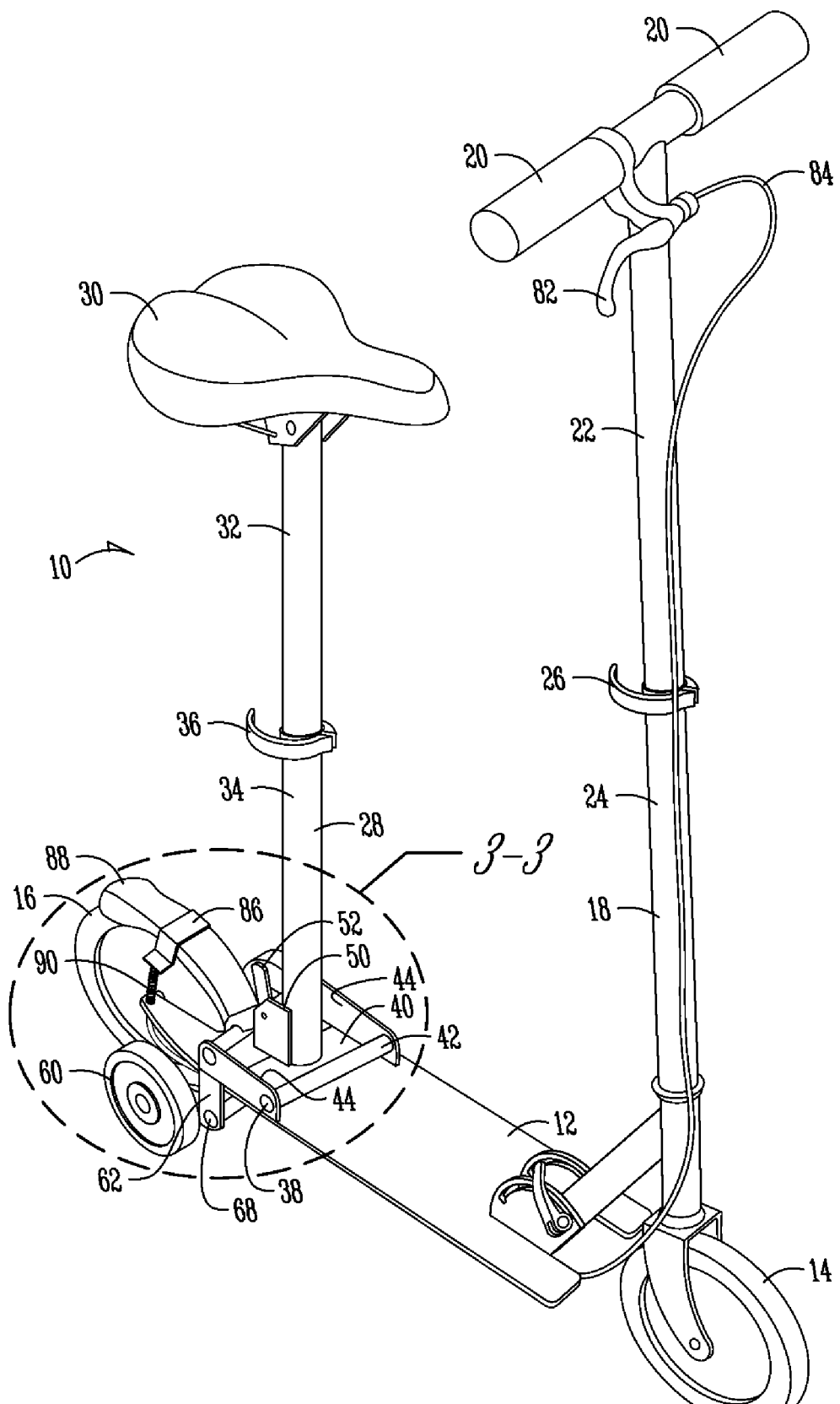
FIG. 1 is a perspective view of the improved scooter of the present invention with the seat and handlebars in the raised, use position.
Figure 2:
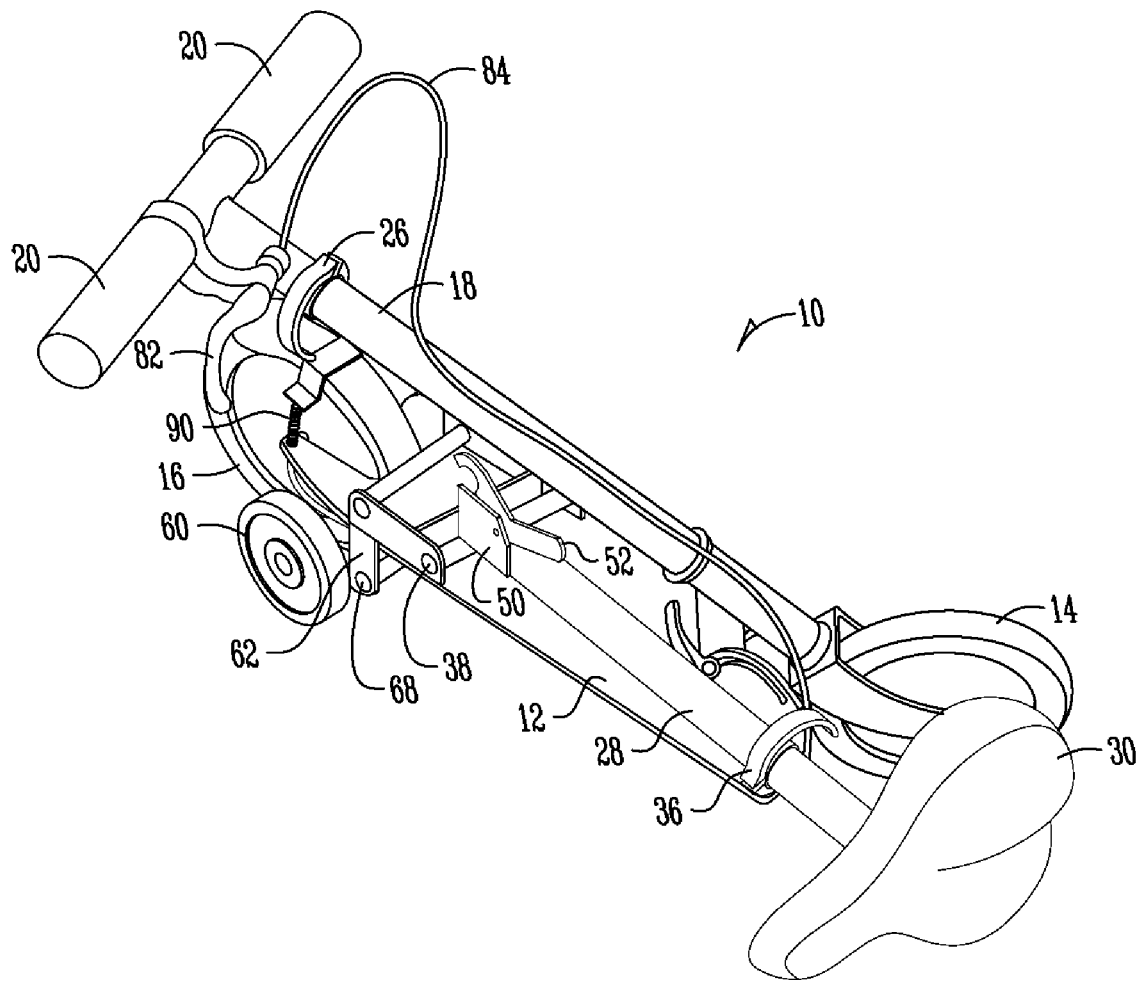
FIG. 2 is a perspective view of the scooter with the seat and handlebars folded down to the storage position.

The scooter of the present invention is generally designated by the reference numeral 10 in the drawings. The scooter 10 includes a base 12 with front and rear primary wheels 14, 16. The scooter 10 also includes a front handlebar post 18 pivotally mounted to the base 12, with a pair of handlebars 20 at the top of the post 18. The post 18 includes telescoping sections 22, 24 so that the height of the handlebars 20 can be adjusted. A quick release clamp 26 is provided for holding the sections 22, 24 at a selected height. The post 18 is pivotally mounted to the base 12 for rotation about a horizontal axis which is perpendicular to the longitudinal axis of the base 12. Thus, the handlebars are moveable between a raised or upright use position and a folded storage position.

The scooter 10 also includes a seat post 28 mounted to the base 12, with a seat 30 at the top of the seat post. The seat post 28 includes upper and lower telescoping sections 32, 34 so that the height of the seat 30 can be adjusted. A quick release clamp 36 is provided for holding the sections 32, 34 at a selected height.

The lower end of the post 28 is pivotally mounted to the base 12 for rotation about a horizontal axis 38. The seat 30 is thus moveable between a raised, upright riding position and a folded storage position adjacent the base 12. The axis 38 is disposed at a non-perpendicular angle with respect to the longitudinal axis of the base 12. Thus, the pivot axes for the handlebars 20 and the seat 30 are offset or non-parallel. Accordingly, the handlebar post 18 and the seat post 28 can be folded downwardly toward one another into a side-by-side orientation without interference, thereby minimizing the size of the scooter 10 in the storage position.

Figure 3:
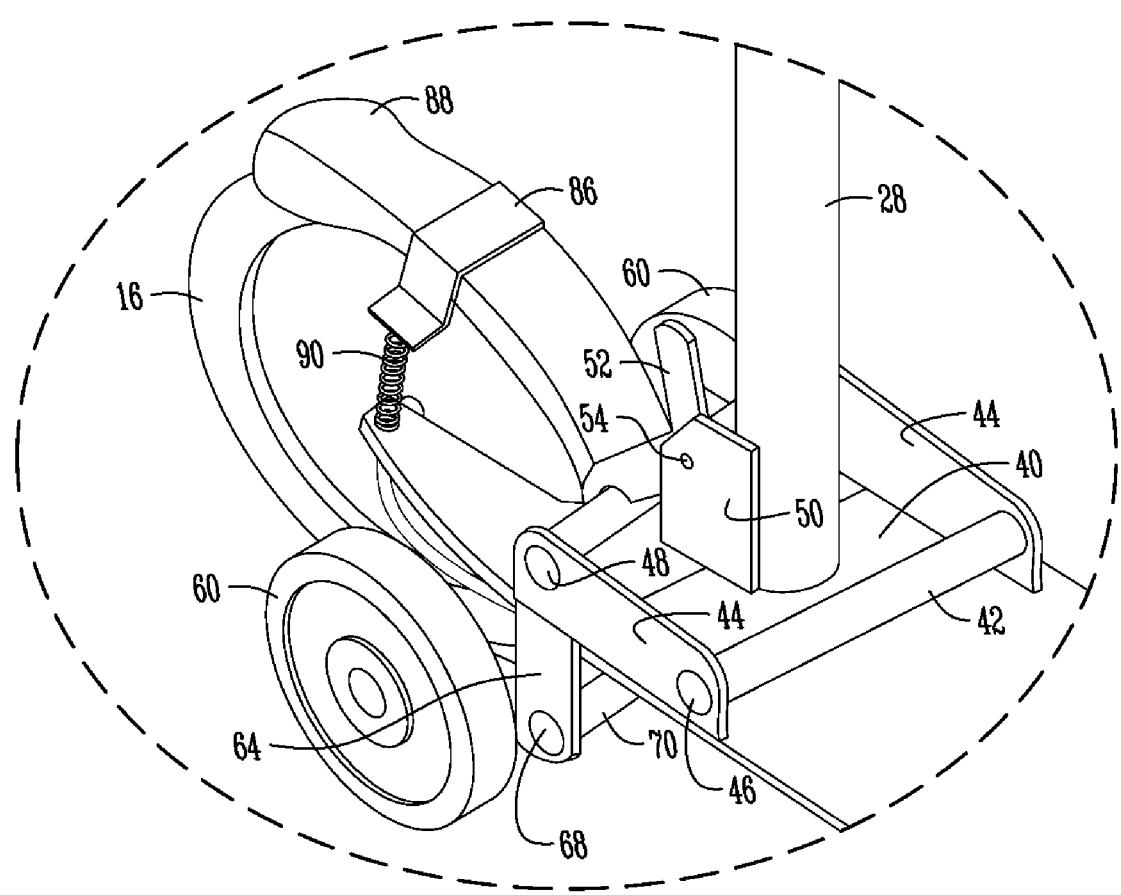
FIG. 3 is an enlarged view of the lower rear end of the scooter taking along lines 3-3 of FIG. 1.
Figure 4:
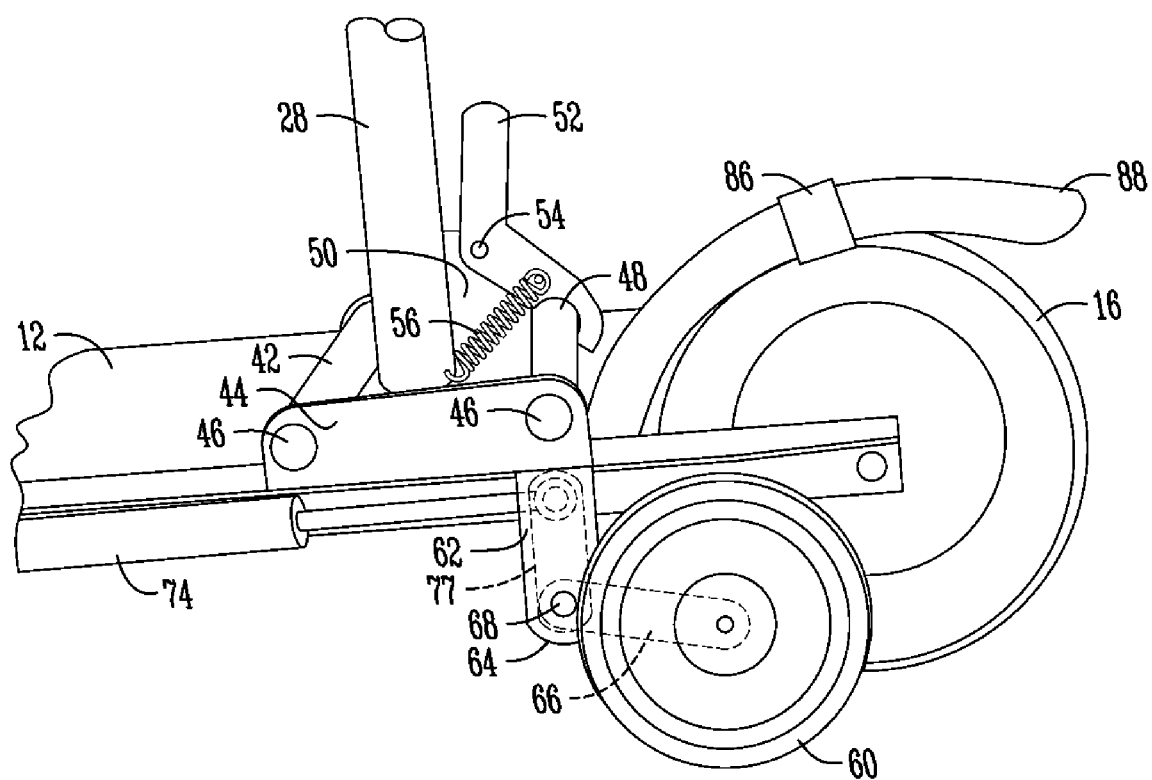
FIG. 4 is an enlarged side elevation view of the lower rear end of the scooter.
Figure 5:
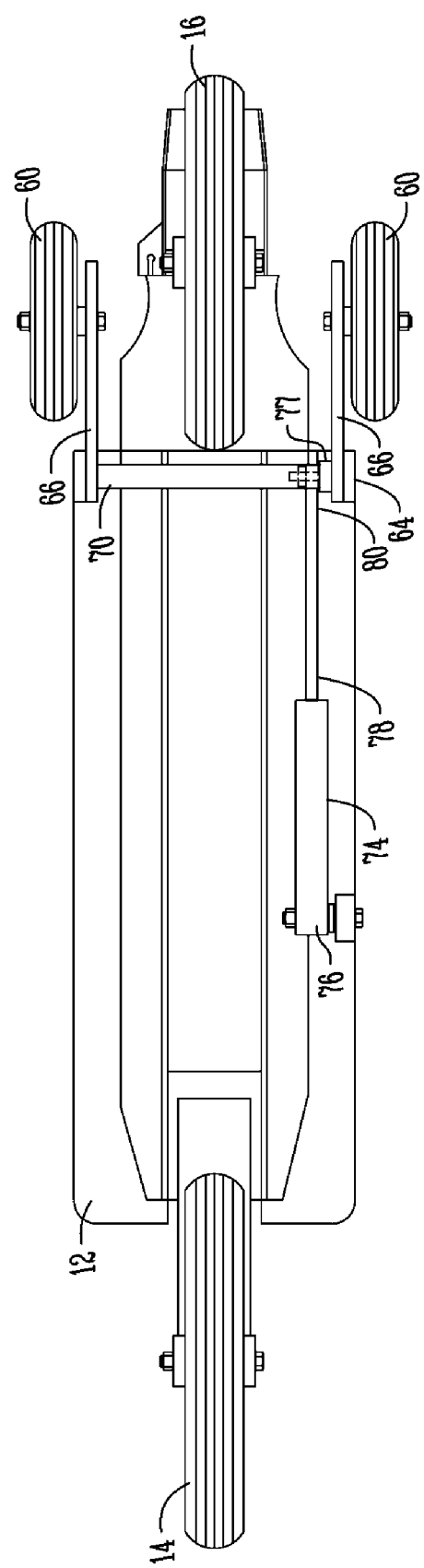
FIG. 5 is a bottom plan view of the scooter and showing the hydraulic cylinder which biases the outrigger wheels.
Figure 6:
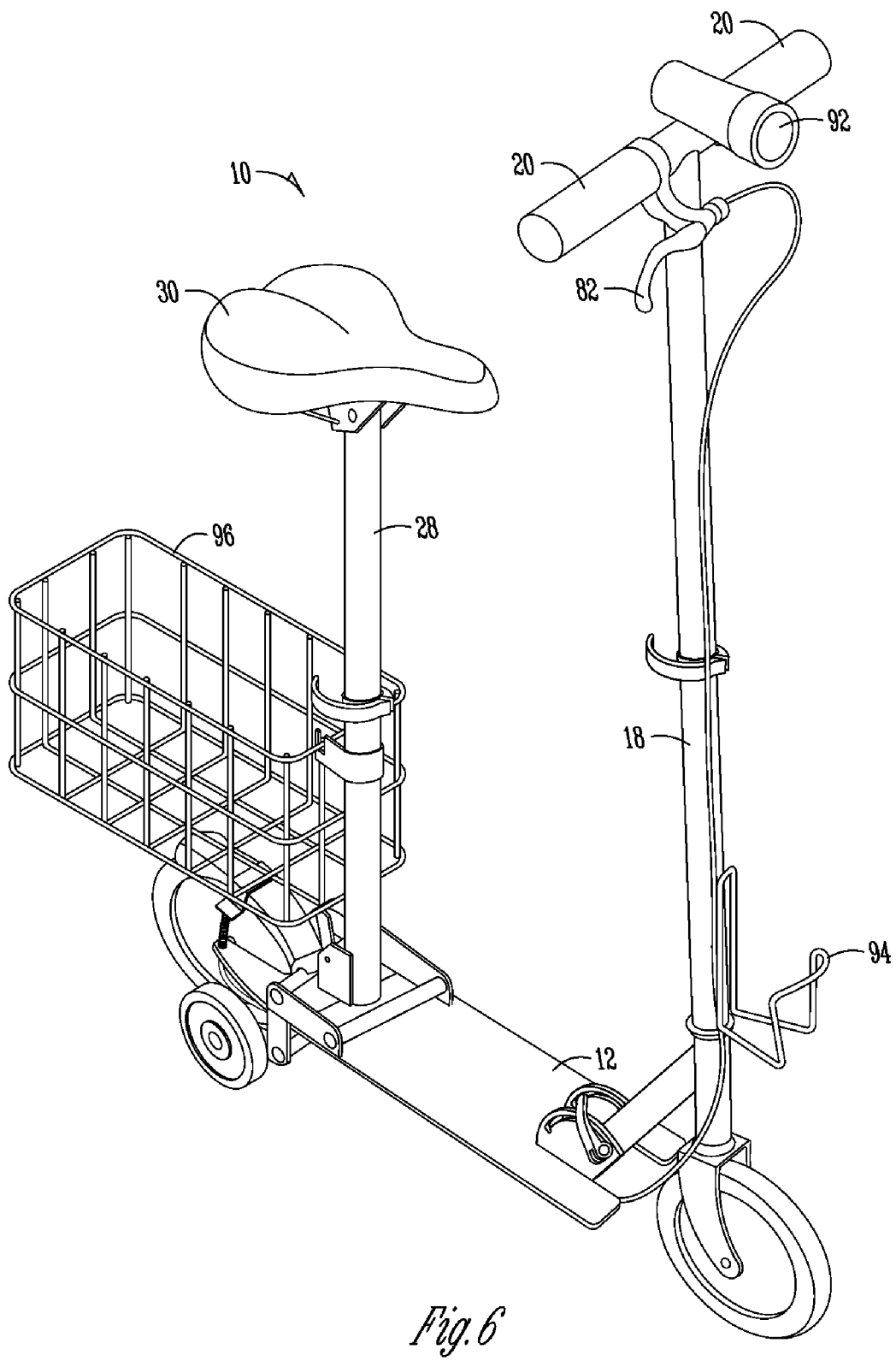
FIG. 6 is a view of the scooter including accessories such as a basket, a light, and water bottle bracket.

A lock mechanism is provided for the seat post 28. More particularly, the seat post 28 is welded or otherwise fixed to a plate 40, which in turn is welded to a tubular sleeve 42 extending between a pair of flanges 44 extending upwardly from the base 12 on opposite sides of the seat post 28, as best seen in FIG. 3. A pin 46 extends through the sleeve 42 and is fixed at opposite ends to the flanges 44 so as to define the axis 38 for the pivotal seat 30. A second pin 48 is fixed at opposite ends to the flanges 44 behind the seat post 28. A bracket 50 is welded to the seat post 28 and/or to the plate 40 to support a pivotal lock lever 52. The lock lever 52 is pivotal about a pin 54 between a locked position engaging the pin 48, as seen in FIGS. 3 and 4, and an unlocked position disengaged from the pin 48, which allows the seat post 28 to fold forwardly about the pivot axis 38. A spring 56 extends between the lock lever 52 and the seat post 28 so as to normally bias the lock lever 52 to the locked position.

The scooter 10 also includes a pair of outrigger wheels 60 spaced on opposite sides of the primary rear wheel 16. The outrigger wheels 60 are mounted on a frame 62 attached to the base 12, and including a pair of legs 64 extending downwardly from the base 12, and a pair of arms 66 pivotally attached to the legs 64 by an axle 68 and extending rearwardly therefrom to support the outrigger wheels 60. Preferably, the arms 66 are each connected to a sleeve 70 pivotally mounted on the axle 68 extending between the legs 64. A hydraulic cylinder 74 normally biases the outrigger wheels 60 to a first lower position when no one is sitting on the seat 30, so as to engage the floor or ground and support the scooter 10 in an upright orientation without being held by a person. The hydraulic cylinder 74 has a first end 76 connected to the base 12 in any convenient manner and an arm 78 with a second end 80 connected to a leg 77 fixed to and extending upwardly from the sleeve 70. When a person sits on the seat 30, the person's weight forces the rear end of the base 12 downwardly to partially retract the arm 78 into the cylinder 74 so that the person's weight is supported by the front and rear wheels 14, 16, and by the outrigger wheels 60. The outrigger wheels 60 also are intended for balancing the scooter 10 when the scooter is not in use. Thus, the outrigger wheels 60 serve the duel function of partially supporting a rider's weight and balancing the scooter 10 when a rider dismounts.

The scooter 10 includes a brake system, with a hand actuated lever 82 on one of the handlebars 20, and a brake cable 84 extending from the hand brake 82 to a bracket 86 mounted on the rear fender 88 above the rear wheel 16. When the hand brake 82 is squeezed or actuated by the rider, the cable 84 pulls the rear fender 88 into an engagement with the rear wheel 16 so as to control the scooter speed, particularly when coasting. A spring 90 extending between the bracket 86 and the base 12 normally biases the fender brake 88 upwardly out of engagement with the rear wheel 16.

Accessories may be provided for the scooter 10. For example, a light 92 may be mounted in any convenient manner on the handlebars 20. A bottle or can holder 94 may be mounted on the handlebar post 18 in any convenient manner for holding water bottles, pop cans, and other beverages. A basket 96 may be removeably mounted on the seat post 28 via a mounting bracket 98 attached to the post in any convenient manner. Preferably, the basket 96 is sufficiently narrow to preclude interference from a person riding the scooter.

In use, the height of the handlebars 20 and the seat 30 are adjusted to fit a particular rider via the quick release clamps 26, 36, respectively. Preferably, when the rider sits on the seat 30, their feet should touch the floor or ground with their knees slightly bent. Thus, the person's weight is substantially supported by the seat 30, rather than their hips, knees, and/or ankles. The rider then propels the scooter forwardly and rearwardly simply by alternatingly moving their feet in a substantially normal gait along the floor or the ground. The front wheel 14 can be easily turned via the handlebars 20. The narrow width of the scooter 10 allows a person to easily maneuver through doorways and up to service counters without getting off the scooter 10. Also, since the rider is sitting down only a few inches onto the seat 30, they are substantially at their full height, thereby allowing easy eye contact with other standing people.

Figure 7:
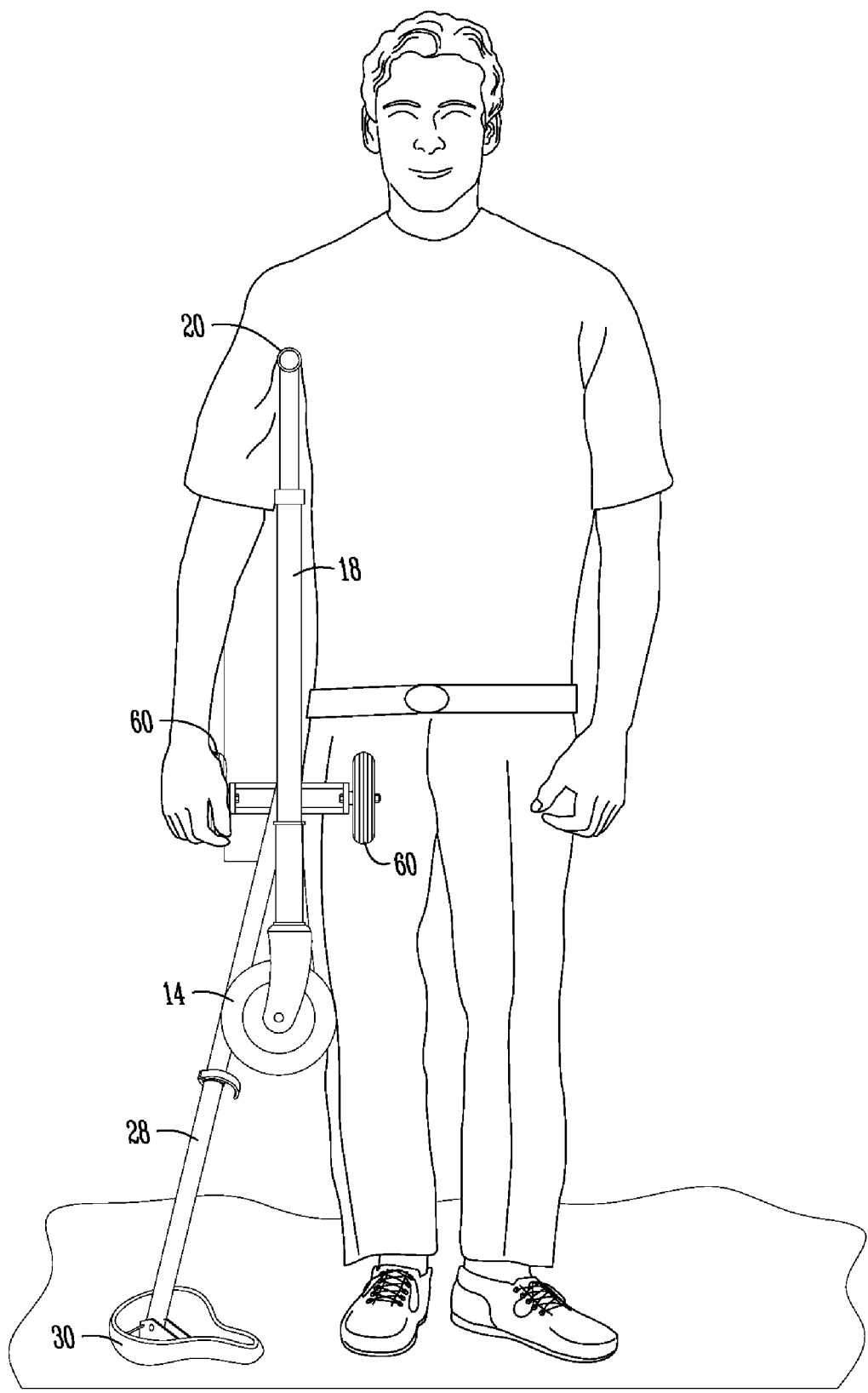
FIG. 7 is a view of the scooter being used as a crutch.

When a person is not riding the scooter 10, the handlebars 20 and the seat 30 can be quickly and easily folded down via the quick release lock levers 26 and 52, respectively. In the folded storage position, the scooter 10 can be easily stowed behind the front seat of an automobile, in an automobile trunk, under a bed, in a closet, in an airplane overhead bin, or other storage areas. Also, as seen in FIG. 7, the folded scooter 10 can be used as a crutch, with the seat 30 engaging the floor and the handlebars 20 residing under the user's armpit. The length of the crutch can be adjusted via the telescoping sections 22, 24 of the handlebar post 18 and the telescoping sections 32, 34 of the seat post 28. Also, by shortening the posts 18 and 28, the folded scooter 10 can be used as a cane, with the seat 30 engaging the floor and a user gripping one of the handlebars 20 in their hand.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A non-motorized scooter, comprising:
   a base having a longitudinal axis;
   a single seat post pivotally mounted on the base for movement approximately 90° between a substantially vertical riding position and a folded storage position;
   a seat on top of the seat post;
   a single handlebar post pivotally mounted on the base for movement between an upright use position and a folded storage position;
   handlebars on top of the handlebar post;
   front and rear primary wheels mounted on the base on the longitudinal axis for supporting a person's weight while sitting on the seat;
   a pair of outrigger wheels on the base and spaced outwardly from the longitudinal axis to maintain the scooter upright when a person is not sitting on the seat;
   the seat and handlebar posts each being mounted on the longitudinal axis of the base;
   the seat and handlebar posts each having a horizontal pivot axis, with the pivot axes being non-parallel; and
   the seat and handlebar posts folding toward one another from the use positions to the storage positions and being substantially side-by-side in the storage positions.

2. The scooter of claim 1 wherein the seat post has a pivotal axis which is non-perpendicular to the base longitudinal axis.

3. The scooter of claim 1 further comprising a lock to releasably retain the seat post in the riding position.

4. The scooter of claim 1 further comprising a brake for the rear wheel and a brake actuator on the handle.

5. The scooter of claim 1 wherein the outrigger wheels are mounted on a frame pivotally connected to the base for movement about a horizontal axis between a lower position and an upper position.

6. The scooter of claim 5 wherein the outrigger wheels are biased to the lower position when the seat is free from a person's weight, and the bias being overcome when a person sits on the seat to move the outrigger wheels to the upper position.

7. The scooter of claim 6 wherein the bias is provided by a cylinder with an extensible and retractable arm extending between the base and the frame.

8. The scooter of claim 1 wherein the seat and handle are each adjustable in height.

9. The scooter of claim 1 wherein the outrigger wheels are behind the seat post.

10. The scooter of claim 1 wherein the outrigger wheels are spaced closely to the rear wheel.

11. A combination scooter, cane and crutch, comprising:
a base having a longitudinal axis with front and rear wheels foldable handlebars pivotally mounted on the base;
a foldable seat pivotally mounted on the base;
the seat and handlebars each being foldable between a raised position whereby a person can ride the scooter and a lowered position with the handle bars extending rearwardly past the rear wheel and the seat extending forwardly past the front wheel whereby a person can use the scooter as a crutch or a cane with the seat engaging the ground or floor and the handlebars positioned under the arm or grasped by one hand; and
the axes of the seat and handlebars being horizontal, with at least one axis being non-perpendicular to the longitudinal axis whereby the seat and handlebars fold downward in opposite directions towards one another so as to be laterally spaced relative to one another in the lowered position.

12. The combination of claim 11 further comprising a pair of outrigger wheels to maintain the scooter in an upright position when not touched by a person.

13. The combination of claim 11 further comprising a lock to releasably retain the seat in the riding position.

14. The combination of claim 11 wherein the seat folds forwardly to the lowered position and the handlebars fold rearwardly to the lowered position.

15. A non-motorized scooter, comprising:
a base having a longitudinal axis;
a single seat post pivotally mounted on the base for movement approximately 90° between a substantially vertical riding position and a folded storage position;
a seat on top of the seat post;
a single handlebar post pivotally mounted on the base for movement between an upright use position and a folded storage position;
handlebars on top of the handlebar post;
front and rear primary wheels mounted on the base on the longitudinal axis for supporting a person's weight while sitting on the seat;
a pair of outrigger wheels on the base and spaced outwardly from the longitudinal axis to maintain the scooter upright when a person is not sitting on the seat;
the seat and handlebar posts each being mounted on the longitudinal axis of the base;
the seat post having a pivotal axis which is non-perpendicular to the base longitudinal axis; and
the seat and handlebar posts folding toward one another from the use positions to the storage positions and being substantially side-by-side in the storage positions.

16. The scooter of claim 15 wherein the seat and handlebar posts each have a horizontal pivot axis, with the pivot axes being non-parallel.

17. The scooter of claim 15 further comprising a lock to releasably retain the seat post in the riding position.

18. The scooter of claim 15 further comprising a brake for the rear wheel and a brake actuator on the handle.

19. The scooter of claim 15 wherein the outrigger wheels are mounted on a frame pivotally connected to the base for movement about a horizontal axis between a lower position and an upper position.

20. The scooter of claim 19 wherein the outrigger wheels are biased to the lower position when the seat is free from a person's weight, and the bias being overcome when a person sits on the seat to move the outrigger wheels to the upper position.

21. The scooter of claim 20 wherein the bias is provided by a cylinder with an extensible and retractable arm extending between the base and the frame.

22. The scooter of claim 15 wherein the seat and handle are each adjustable in height.

* * * * *